United States Patent [19]
Spitler et al.

[11] Patent Number: 6,022,912
[45] Date of Patent: Feb. 8, 2000

[54] EXPANSION OF POLYMERIC MICROSPHERES INSITU IN A RIGID PUR/PIR FOAM FORMULATION USING A TWIN SCREW EXTRUDER

[75] Inventors: Keith G. Spitler, Burgettstown; Rick L. Archey, Pleasant Hills; Carl E. Holsinger, Freedom; Leslie J. Vescio, Ambridge, all of Pa.

[73] Assignee: Bayer Corporation, Pittsburgh, Pa.

[21] Appl. No.: 09/158,209

[22] Filed: Sep. 22, 1998

[51] Int. Cl.[7] .................... B29D 31/00; B29C 35/00; C08J 3/00; C08K 9/00; C08L 75/00

[52] U.S. Cl. .................... 523/218; 264/45.1; 264/45.3; 521/54; 523/200

[58] Field of Search .................... 523/200, 218; 264/45.1, 45.3; 521/54

[56] References Cited

U.S. PATENT DOCUMENTS

| | | | |
|---|---|---|---|
| 5,424,014 | 6/1995 | Glorioso et al. | 264/45.3 |
| 5,665,785 | 9/1997 | McClellan et al. | 521/51 |

*Primary Examiner*—Patrick D. Niland
*Attorney, Agent, or Firm*—Joseph C. Gil; Noland J. Cheung

[57] ABSTRACT

The present invention relates to a process for producing a dispersion of polymeric microspheres in a polyol comprising expanding 1 to 70% by weight of polymeric beads in a polyol with a twin screw extruder to simultaneously mix and expand the beads to create a uniform dispersion of the microspheres in the polyol such that the wetting of the microspheres by the polyol is maximized.

8 Claims, 6 Drawing Sheets

EXPANSION OF POLYMERIC MICROSPHERES INSITU IN A RIGID PUR/PIR FOAM FORMULATION USING A TWIN SCREW EXTRUDER

BACKGROUND OF THE INVENTION

Rigid foams made from filled polyols are known. Such foams are typically produced by reacting a polyisocyanate with an isocyanate reactive material such as polyol in the presence of a blowing agent.

In recent years, the substantial increases in costs of the basic materials used to make foam, has encouraged the development and use of filler materials to reduce the amount of the basic materials used and the weight of the finished materials. One of the suggested filler materials and insulating materials utilizes hollow microspheres.

High loadings of inert and/or inorganic fillers pose several limitations on convention flexible and rigid foam processing methods: 1) high intrinsic viscosity; 2) difficult to completely wet-out particles; and 3) unstable dispersion leads to agglomeration and/or settling. High loadings of fillers, however, offer some very interesting potential benefits: 1) inexpensive; 2) offer ability to encapsulate additives; 3) improve compressive strength; and 4) alter energy absorbing capability.

The use of hollow polymeric microspheres as a filler in rigid boardstock polyol is disclosed in U.S. Ser. No. 08/909,447. Because of the extremely high viscosities in using fillers, polyol levels containing significant levels of these fillers cannot be processed on conventional boardstock mixing and metering equipment.

SUMMARY OF THE INVENTION

The present invention relates to a process for producing a dispersion of polymeric microspheres in a polyol comprising expanding 1 to 70% by weight of polymeric beads in a polyol with a twin screw extruder to simultaneously mix and expand the beads to create a uniform dispersion of the microspheres in the polyol such that the wetting of the microspheres by the polyol is maximized.

DETAILED DESCRIPTION OF THE INVENTION

Figure 1:
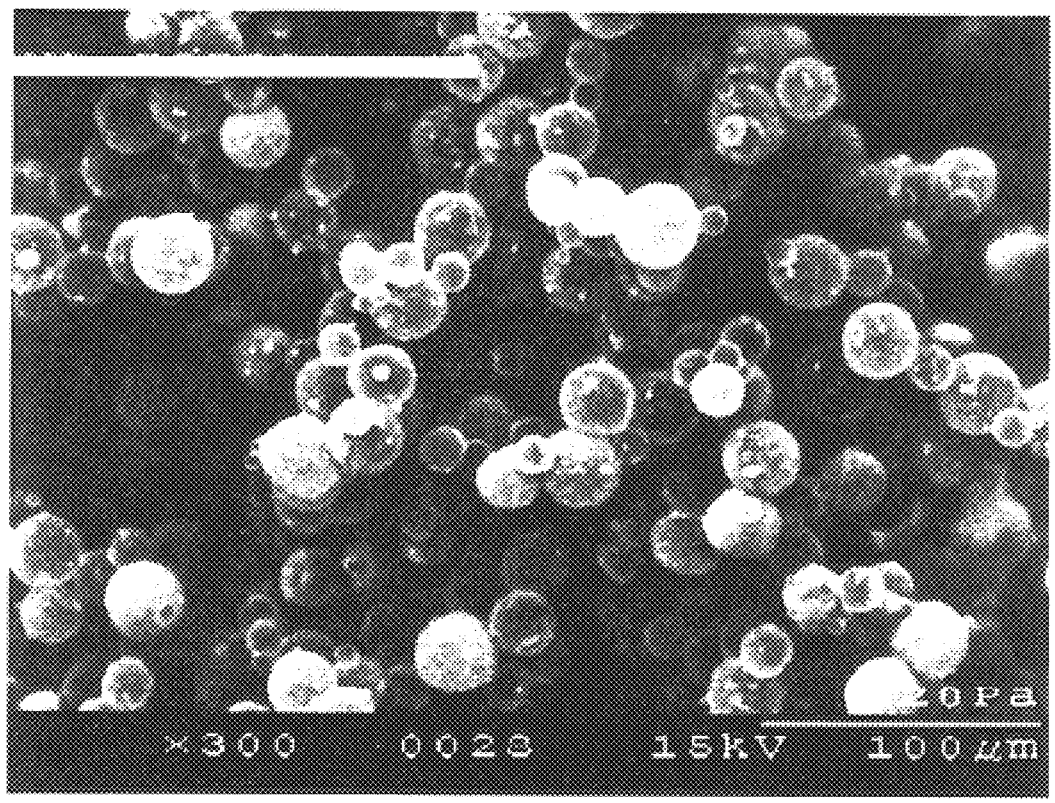
FIG. 1 is a micrograph of Sample No. 10, as discussed in the examples, wherein 50 weight percent of beads are expanded at 300 RPM screw speed and 100° C. barrel temperatures.

The present invention relates to a process for the continuous processing of filled polyols containing microspheres for PUR/PIR foams.

The expression "PUR/PIR foam" refers to polyurethane and/or isocyanurate foam produced by generation of gas bubbles during reaction of the polymer matrix.

In the process of the present invention, an extruder is used to mix and expand the polymeric beads in a polyol into microspheres wherein a uniform dispersion of microspheres in the polyol is produced. The dispersion is subsequently mixed with other ingredients such as an isocyanate to produce a PUR/PIR foam. Preferably, a twin screw extruder is used. Such technology, for example, is disclosed in U.S. Pat. No. 5,424,014.

The dispersion contains between 1 to 70 weight percent of polymeric beads and preferably between 10 and 60 weight percent of polymeric beads.

The hollow microspheres used herein are known. The microspheres are produced from polymeric beads comprised of a polymer melting below the decomposition temperature of the polyol of the present invention. Commercially available beads include WU-551 or Expancel DU551, which is available from Expancel Inc; Dualite M6032AE, which is from Pierce & Stevens Corporation. The Expancel and Dualite type beads are both expandable to hollow microspheres consisting of a thin shell of a copolymer of polyvinyl chloride, polystyrene, vinylidene chloride and/or acrylonitrile. The interior of the Expancel and Pierce & Stevens microspheres typically contain a volatile hydrocarbon, which contain isobutane, isopentane or cyclopentane, but also could be made with custom low boiling solvents, if necessary. More preferably, the low boiling hydrocarbons are isomers of butane or pentane or a combination of both butane and pentane. In the example of a polymeric shell, when the bead is heated, the polymer gradually softens, the volatile hydrocarbon evaporates, thus expanding the beads into microspheres. In a preferred embodiment, the shell of the microsphere is made of polyvinylchloride, polystyrene, polyacrylonitrile, or blends thereof. Most preferably, the microsphere is made of a copolymer of polyvinyl chloride/acrylonitrile.

It is typical of available microspheres that a given sample contains a range of sizes. The microspheres provided in this invention are hollow spheres with a mean diameter of between 80 to 200 microns, preferably 80 to 140 microns, most preferably 80 to 120 microns.

The addition of the amount of beads is such that the weight percent of the beads to the foam product is 1 to 70 percent by weight of the hollow microspheres. Preferably, the weight percent of the microspheres is from 10 to 60 weight percent and most preferably from 20 to 60 weight percent.

The foam of the present invention is a closed cell polyurethane or polyisocyanurate foam such that the diameter of the cells of the foam range from 0.01 to 60 microns.

The production of rigid foams of the present invention based on isocyanates is known per se and is described, for example, in German Offenlegungsschriften 1,694,142, 1,694,215 and 1,720,768, as well as in Kunststoff-Handbuch [Plastics Handbook], Volume VII, Polyurethane, edited by Vieweg and Hochtlen, Carl Hanser Verlag, Munich 1966, and in the new edition of this tome, edited by G. Oertel, Carl Hanser Verlag, Munich, Vienna, 1983.

These foams are mainly those that comprise urethane and/or isocyanurate and/or allophanate and/or uretdione and/or urea and/or carbodiimide groups. The following can be employed for the production of the rigid foams based on isocyanates, using the microspheres according to the present invention:

a) As starting components, aliphatic, cycloaliphatic, araliphatic, aromatic and heterocyclic polyisocyanates, such as those described, for example, by W. Siefken in Justus Liebigs Annalen der Chemie, 562, pp. 75–136, for example, those of the formula

$Q(NCO)_n$ in which n denotes 2–4, preferably 2–3, and Q denotes an aliphatic hydrocarbon radical of 2–18, preferably 6–10 carbon atoms, a cycloaliphatic hydrocarbon radical of 4–15, preferably 5–10 carbon atoms, an aromatic hydrocarbon radical of 6–15, preferably 6–13 carbon atoms or an araliphatic hydrocarbon radical of 8–15, preferably 8–13 carbon atoms, for example, such polyisocyanates as described in DE-OS 2,832,253, pp 10–11.

Particularly preferred are usually those polyisocyanates which are technically readily accessible, for example, the 2,4- and 2,6-toluylene diisocyanate as well as any mixture of these isomers ("TDI"); polyphenyl-polymethylenepolyisocyanates, such as those obtained by an anilineformaldehyde condensation and subsequent treatment with phosgene ("crude MDI"), and polyisocyanates comprising carbodiimide groups, urethane groups, allophanate groups, isocyanurate groups, urea groups or biuret groups ("modified polyisocyanates"), especially those modified polyisocyanates which are derived from 2,4- and/or 2,6-toluylene diisocyanate and from 4,4'- and/or 2,4'-diphenylmethane diisocyanate.

b) The starting components may further be compounds of a molecular weight usually of 400 to 10,000, containing at least two hydrogen atoms reactive toward isocyanates. These comprise, besides compounds containing amino, thio, or carboxyl groups, preferably compounds containing hydroxyl groups, in particular compounds containing 2 to 8 hydroxyl groups, especially those of a molecular weight of 1,000 to 6,000, preferably 2,000 to 6,000, for example polyethers and polyesters as well as polycarbonates and polyester amides containing at least 2, usually 2 to 8, preferably 2 to 6 hydroxyl groups; these compounds are known per se for the preparation of homogenous and cellular polyurethanes and are disclosed, for example in DE-OS 2,832,253, pp. 11–18. Preferably, any typical polyalcohol may be used as long as there are no contaminants or additives which would dissolve, swell, or otherwise attack the polymeric beads and thus, impair their expansion into microspheres.

c) When appropriate, compounds comprising at least two hydrogen atoms reactive toward isocyanates and of a molecular weight of 32 to 399 may be used as further starting components. Also, in this case, compounds containing hydroxyl groups and/or amino groups and/or thiol groups and/or carboxyl groups, preferably compounds containing hydroxyl groups and/or amino groups, are understood to be those which are used as chain lengtheners or crosslinking agents. These compounds usually have 2 to 8, preferably 2 to 4 hydrogen atoms reactive toward isocyanates. Appropriate examples are disclosed in DE-OS 2,832, 253, pp.19–20.

d) The blowing agents which may be used in the process of the present invention include water and/or readily volatile inorganic or organic substances and other auxiliary volatile blowing agents typically used to blow PUR/PIR foams. Organic blowing agents include acetone, ethylacetate; halogen-substituted alkanes, such as methylene chloride, chloroform, ethylidene chloride, vinylidene chloride, monofluorotrichloromethane, chlorodifluoromethane, dichlorodifluoromethane, dichlorodifluoroethane, dichlorotrifluoroethane; also butane, hexane, heptane or diethyl ether. Specific examples of such blowing agents include: 1,1,1,4,4,4-hexafluorobutane (HFC-356); the tetrafluoroethanes such as 1,1,1,2-tetrafluoroethane (HFC-134a); the pentafluoropropanes such as 1,1,2,2,3-pentafluoropropane (HFC-245ca), 1,1,2,3,3-pentafluoropropane (HFC-245ea), 1,1,1,2,3-pentafluoropropane (HFC-245eb), and 1,1,1,3,3-pentafluoropropane (HFC-245fa); the hexafluoro-propanes such as 1,1,2,2,3,3-hexafluoropropane (HFC-236ca), 1,1,1,2,2,3-hexafluoropropane (HFC-236cb), 1,1,1,2,3,3-hexafluoro-propane (HFC-236ea), 1,1,1,3,3,3-hexafluoropropane (HFC-236fa); the pentafluorobutanes such as 1,1,1,3,3-pentafluorobutane (HFC-365); and difluoroethanes such as 1,1-difluoroethane (HFC-152a). Inorganic blowing agents are, for example, air, $CO_2$ or $N_2O$. A blowing effect may also be obtained by adding compounds which decompose at temperatures above room temperature giving off gases, such as azodicarbonamide or azoisobutyronitrile. Other examples of blowing agents may be found in Kunststoff-Handbuch, Vol. VII, by Vieweg and Hochtlen, Carl-Hanser-Verlag, Munich, 1966, on pages 108 and 109, 453 to 455 and 507 to 510.

e) When appropriate, other auxiliary agents and additives may be used at the same time, such as:

water and/or other highly volatile organic substances as propellants;

additional catalysts of the type known per se in amounts up to 10% by weight, based on the component b);

surface-active additives, such as emulsifiers and foam stabilizers, and reaction retardants, for example acidic substances such as hydrochloric acid or organic acid halides, also cell regulators of the type known per se, such as paraffins or fatty alcohols or dimethylpolysiloxanes, as well as, pigments or dyes and other flame retardants of the type known per se, for example tricresyl phosphate, also stabilizers against the effect of aging and weathering, plasticizers and fungistats and bacteriostats as well as fillers such as barium sulphate, kieselguhr, carbon black or whiting.

Other examples of surface active additives, foam stabilizers, cell regulators, reaction retardants, stabilizers, flame retardants, plasticizers, dyes, fillers, fungistats, bacteriostats to be used at the same time if appropriate, as well as details concerning the use and action of these additives are described in Kunststoff-Handbuch [Plastics Handbook], Volume VII, edited by Vieweg and Hochtlen, Carl Hanser Verlag, Munich 1966, for example on pages 103–113.

The isocyanate-based foams can be prepared in a manner known per se.

The preparation of polyurethane plastics may be prepared for example, as follows: the reactants are caused to react by the single-stage process known per se, the prepolymer process or the semiprepolymer process, frequent use being made of plant machinery, for example that disclosed in U.S. Pat. No. 2,764,565. Details concerning the processing plant which are likewise relevant according to the invention, are described in Kunststoff-Handbuch, Volume VII, edited by Vieweg and Hochtlen, Carl Hanser Verlag, Munich 1966, for example on pages 121–205. Because of the inherently high viscosities of formulations containing high loadings of microspheres, additional processing considerations are necessary. One commercial solution is the use of an extruder for mixing and metering the slurry containing the microspheres. Such technology, for example is disclosed in U.S. Pat. No. 5,424,014.

The screw design and speed, throughput, and barrel temperature of the extruder of the present invention are adjusted so that the temperature of the polyol is maintained between a $T_{start}$ and $T_{max}$ for the polymer of the bead chosen. $T_{start}$ is defined as the temperature at which the expansion of the bead into a microsphere begins and $T_{max}$ is defined as the upper limit to prevent bursting of the microsphere. Such temperatures are generally known in the art. $T_{max}$ is generally shown to be in the range from 110 to 200 degrees C.

The products obtainable according to the present invention may be used, for example, as energy absorbing foams; insulation for appliances; laminated boards as exterior wall elements, roof insulating board, interior walls, insulated doors, etc.

EXAMPLES

The following examples were processed using a ZSK30 twin-screw extruder from Werner-Pfleiderer GmbH. The screw design was selected based on the viscosity and throughput of the following examples.

Accordingly, if other viscosities or throughputs were required, the design would be changed/optimized. The poly-alcohol used was Stepanpol 2352 (Stepan Chemical) and is a polyester poly-alcohol based on phthalic anhydride, which is typically used in the production of PUR/PIR foams. The polymeric beads used are WU-551 from Expancel Corporation and are composed of polyvinyl chloride/acrylonitrile copolymer swollen with iso-butane. These beads were chosen because of their low cost and appropriate melting point of about 100 degrees Celsius. Two measures were used to assess the degree of expansion of the polymeric beads into microspheres. The density of the resulting dispersion was measured using a pyncnometer volume displacement method. A lowering of the density of the dispersion would be an indication of successful expansion. Visual confirmation of the expansion was also obtained using electron micrographs.

Example 1

A dispersion of 50 weight percent WU 551 polymeric beads were processed at 300 RPM screw speed and the barrel temperature was varied:

| Sample # | Temperature (° C.) | Density (PCF) | Density (g/cc) |
|---|---|---|---|
| 1 | 25 | 87.4 | 1.4 |
| 2 | 100 | 11.9 | 0.19 |
| 3 | 135 | 20.6 | 0.33 |
| 4 | 145 | 44.9 | 0.72 |
| 5 | 155 | 46.2 | 0.74 |

Example 2

A dispersion of 50 weight percent WU 551 polymeric beads were processed at a barrel temperature of 100° C. and the screw speed was varied:

| Sample # | Screw Speed, RPM | Density (PCF) | Density (g/cc) |
|---|---|---|---|
| 6 | 100 | 58.1 | 0.93 |
| 7 | 300 | 11.9 | 0.19 |
| 8 | 400 | 30.6 | 0.49 |
| 9 | 500 | 33.7 | 0.54 |

Example 3

At a screw speed of 300 RPM, and a barrel temperature of 100° C., the weight percent of WU 551 polymeric beads in a dispersion was varied:

| Sample # | Wt % of Beads | Density (PCF) | Density (g/cc) |
|---|---|---|---|
| 10 | 50 | 11.9 | 0.19 |
| 11 | 60 | 34.3 | 0.55 |
| 12 | 70 | 27.5 | 0.44 |

Figure 2:
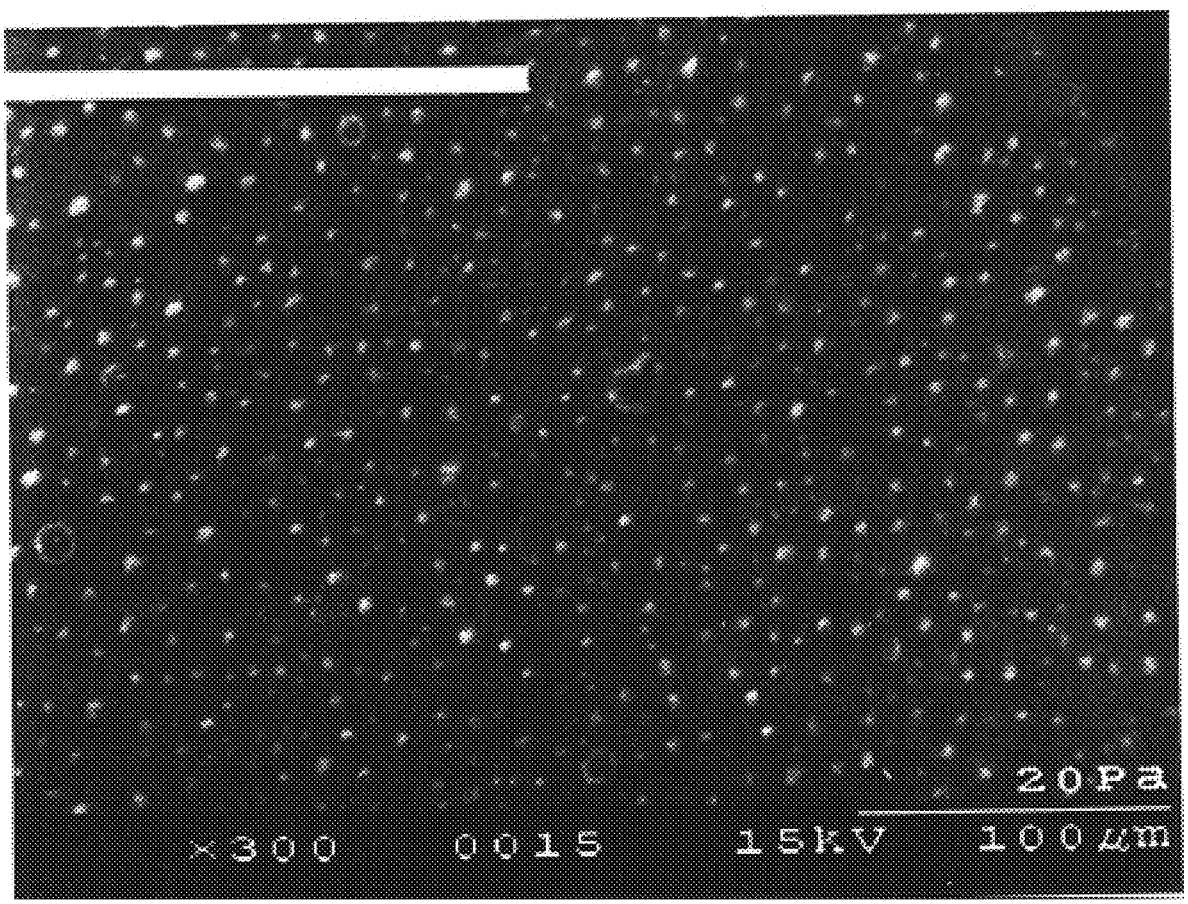
FIG. 2 is a micrograph of Sample No. 1, as indicated in the examples, wherein 50 weight percent of beads are expanded at 300 RPM screw speed and 25° C. barrel temperature.
Figure 3:
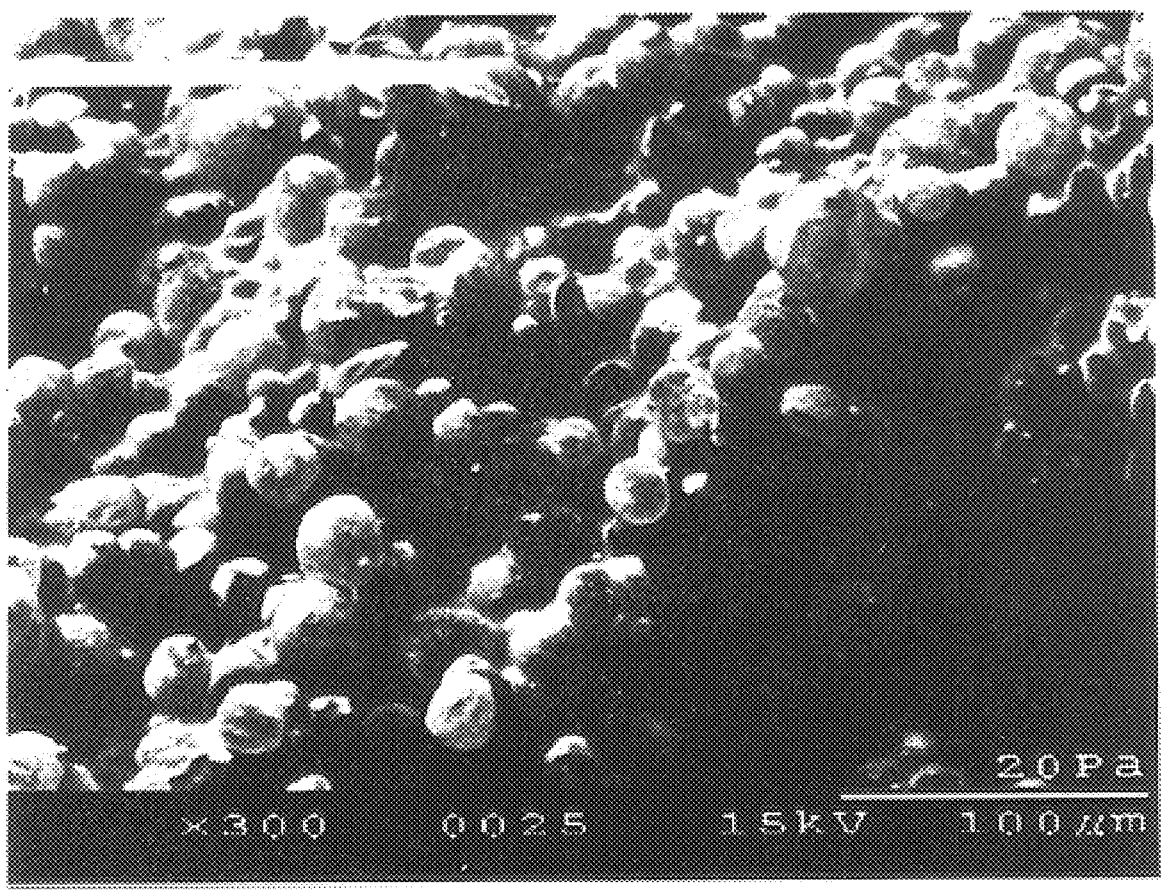
FIG. 3 is a micrograph of Sample No. 5, as indicated in the examples, wherein 50 weight percent of beads are expanded at 300 RPM screw speed and 155° C. barrel temperature.
Figure 4:
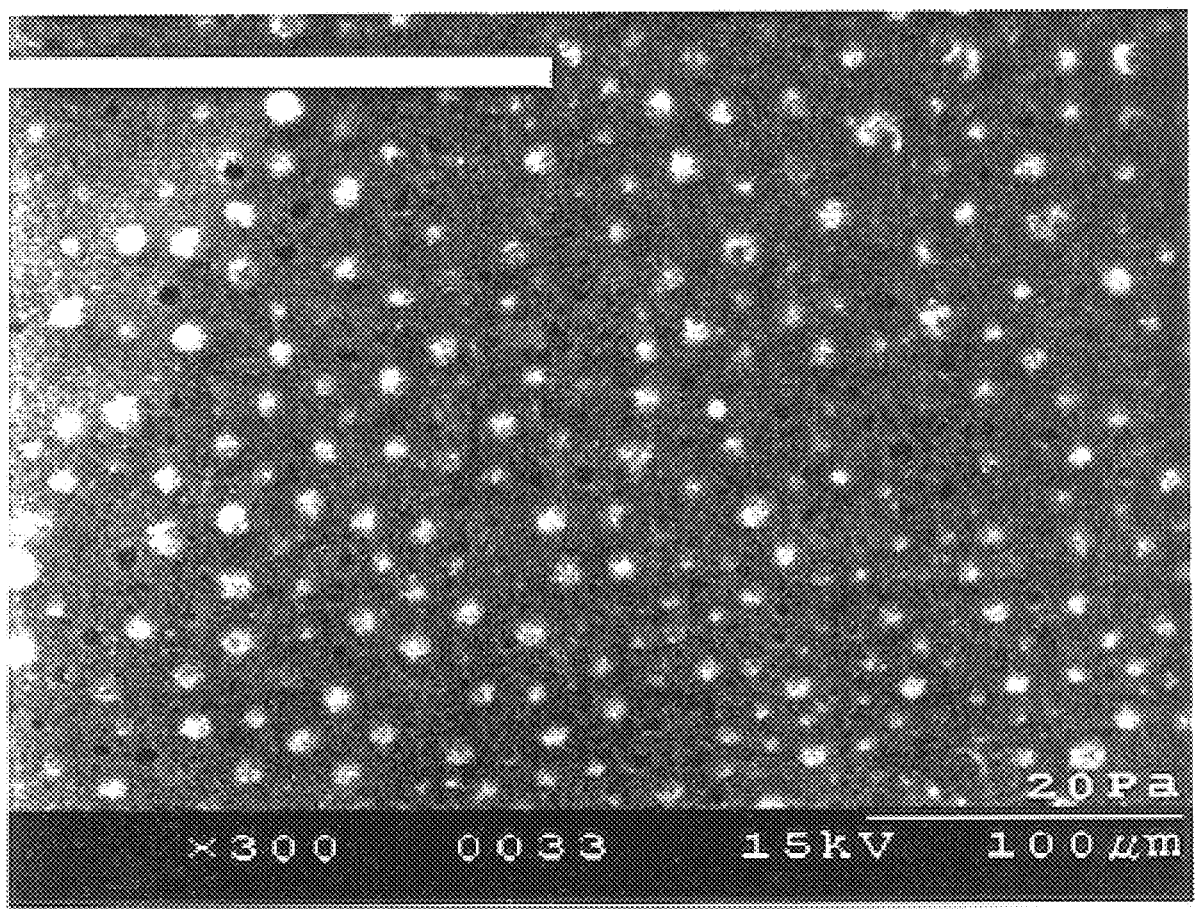
FIG. 4 is a micrograph of Sample No. 6, as indicated in the examples, wherein 50 weight percent of beads are expanded at 100 RPM screw speed and 100° C. barrel temperature.
Figure 5:
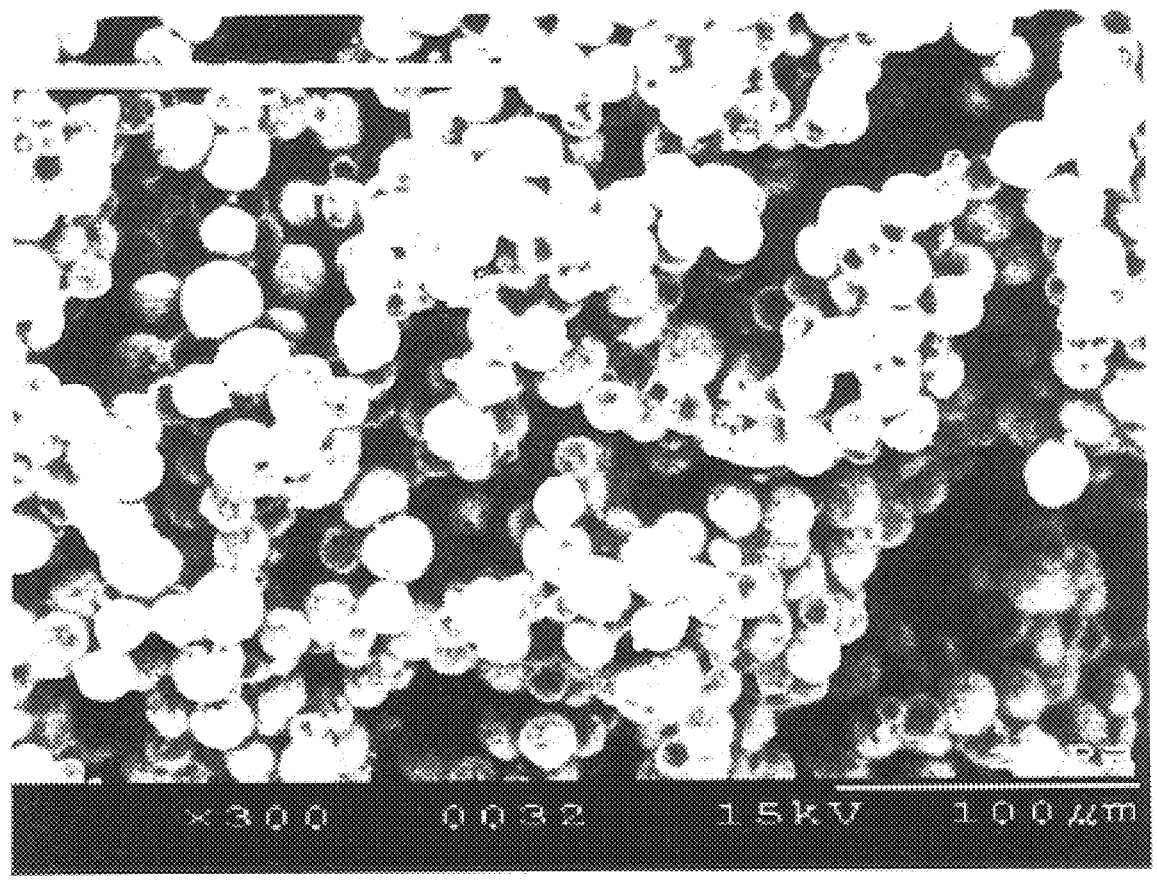
FIG. 5 is a micrograph of Sample No. 8, as indicated in the examples, wherein 50 weight percent of beads are expanded at 400 RPM screw speed and 100° C. barrel temperature.
Figure 6:
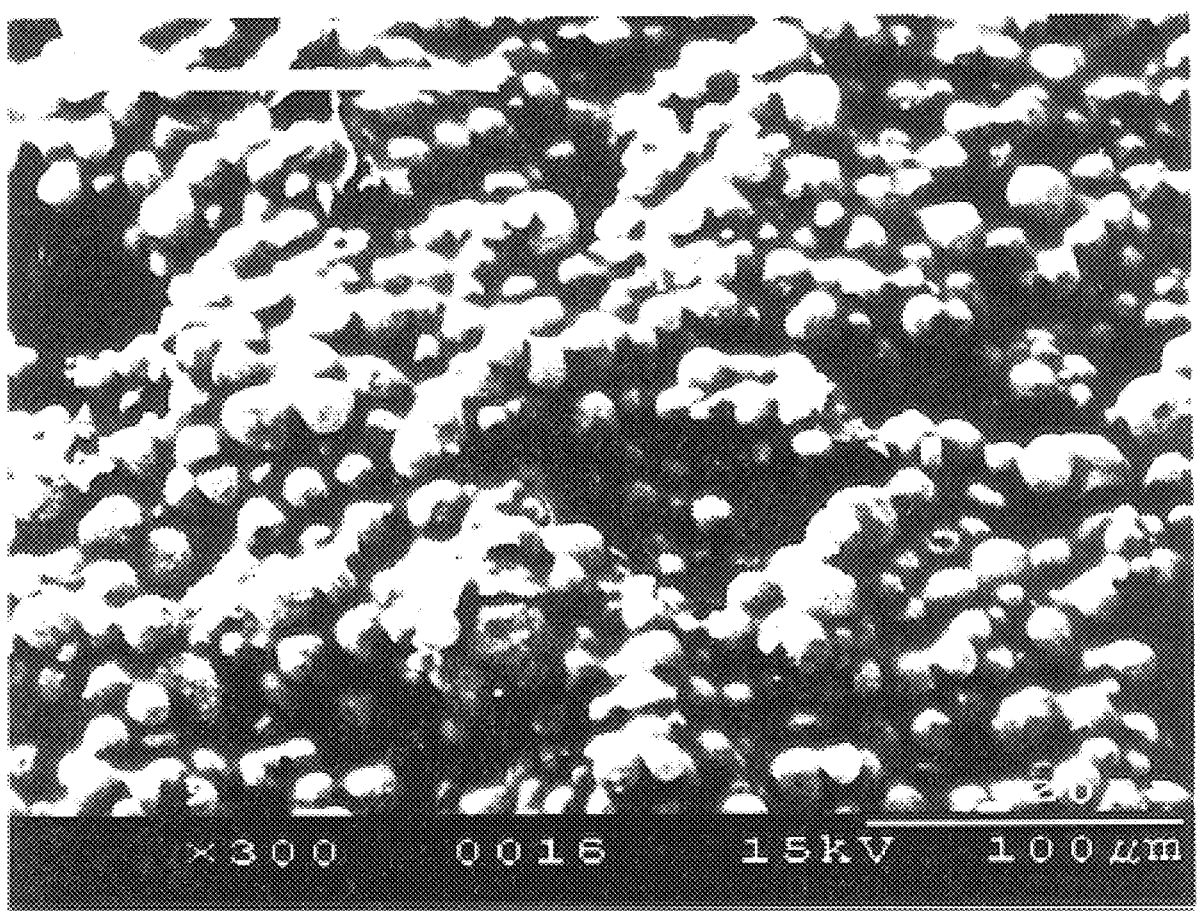
FIG. 6 is a micrograph of Sample No. 9, as indicated in the examples, wherein 50 weight percent of beads are expanded at 500 RPM screw speed, and 100° C. barrel temperature.

Examples 1 and 2 clearly show an optimum barrel temperature and screw speed for the 50 weight percent dispersion, in this case, Sample #10, shown in in FIG. 1. If the temperature is too low, Sample #1, the beads do not expand and the density of the dispersion is the theoretical limit, as shown in FIG. 2. At higher temperatures, the microspheres over expand and melt, e.g. Sample #5, as shown in FIG. 3. The total energy for expansion, however, is not just from the barrel temperature, but additional shear energy is put into the system from the twin-screw rotation. At 100° C., if the screw speed and therefore, the shear energy is low, very little expansion of the beads occur, see Sample #6, as shown in FIG. 4. If the srew speed is too high, the microspheres begin to collapse, Sample #8, as shown in FIG. 5, and eventually melt, Sample #9, as shown in FIG. 6. From Example 3, it is clear that these optimum conditions will change as the loading of the polymeric beads is increased. In fact, these optimum conditions would logically also need to be re-defined for different barrel diameters, barrel configurations, type of poly-alcohol, type of polymeric bead, and desired throughput. Such re-optimization must take into account the barrel temperature, screw speed and the interaction of the temperature, screw design, and speed to ensure the fill and complete insitu expansion of the beads into microspheres.

Whereas, particular embodiments of this invention have been described herein for purposes of illustration, it will be evident to those skilled in the art that numerous variations in the details may be made without departing from the invention as described in the claims appended hereto.

What is claimed is:

1. A process for producing a dispersion of polymeric microspheres in a polyol comprising expanding 1 to 70% by weight of polymeric beads in said polyol with a twin screw extruder to simultaneously mix and expand the beads to create a uniform dispersion of said microspheres in said polyol such that the wetting of said microspheres by the said polyol is maximized, wherein said microspheres have a mean diameter ranging from 80 to 200 microns.

2. A process according to claim 1, wherein said microspheres are produced from said polymeric beads comprising a polymer melting below the decomposition temperature of said polyol.

3. A process according to claim 2, wherein said polymer is selected from the group consisting of polyvinyl chloride, polyvinylidene chloride, polystyrene, polyacrylonitrile or blends thereof.

4. A process according to claim 3, wherein said polymer is polyvinyl chloride/acrylonitrile copolymer.

5. A process according to claim 2, wherein said microsphere contains a low boiling hydrocarbon as a blowing agent.

6. A process according to claim 5, wherein said low boiling hydrocarbon is selected from the group consisting of isomers of butane, or pentane or both butane and pentane.

7. A process according to claim 1, wherein said dispersion comprises between 10 to 60% by weight of polymeric beads.

8. A process according to claim 7, wherein said dispersion comprises between 20 to 50% by weight of polymeric beads.

* * * * *